United States Patent [19]

Mock

[11] Patent Number: 4,881,961

[45] Date of Patent: Nov. 21, 1989

[54] CONTROL MANIFOLD INSERTED IN THE FLOW ROUTE OF A SYSTEM FOR TRANSFERRING PRESSURE MEDIA IN A GASEOUS AND/OR LIQUID GASEOUS STATE

[76] Inventor: Bruno A. Mock, Buolterlistrasse 63, 6052 Hergiswil NW, Switzerland

[21] Appl. No.: 198,328

[22] Filed: May 25, 1988

[30] Foreign Application Priority Data

Jun. 4, 1987 [CH] Switzerland .................. 2121/87

[51] Int. Cl.$^4$ .............................................. F25B 45/00
[52] U.S. Cl. ........................................ 62/292; 62/125; 137/861
[58] Field of Search ................ 62/149, 77, 292, 125; 137/861, 559; 141/311 R, 348

[56] References Cited

U.S. PATENT DOCUMENTS

| | | | |
|---|---|---|---|
| 3,118,463 | 1/1964 | Lacart | 62/77 X |
| 3,302,421 | 2/1967 | Karnes | 62/292 X |
| 4,092,865 | 6/1967 | Strybel | 137/861 X |
| 4,516,603 | 5/1985 | Mock | 62/292 X |

Primary Examiner—Harry B. Tanner
Attorney, Agent, or Firm—Herbert Dubno

[57] ABSTRACT

The control manifold comprises a manifold casing which is at least approximately hexagonal, a pair of parallel sides forming thereby the upper and lower narrow sides of the casing, between which, the internal-casing conduit section of the connecting piece for the vacuum pump and for the pressure-medium supply container extend vertically and approximately concentrically; the conduit sections of the intake and outlet pieces lead into the upper end area of said supply container, the intake and outlet pieces each running parallel and near to the narrow sides joining at the upper narrow side of the casing. In this connection, the connecting piece is common to both the low-pressure side as well as the high-pressure side. From the foregoing there results a very compact and manageable manifold casing with very short, straight and hence easily-manufactured flow routes on one level.

4 Claims, 1 Drawing Sheet

CONTROL MANIFOLD INSERTED IN THE FLOW ROUTE OF A SYSTEM FOR TRANSFERRING PRESSURE MEDIA IN A GASEOUS AND/OR LIQUID GASEOUS STATE

FIELD OF THE INVENTION

The present invention relates to a control manifold (valve assembly) inserted in the flow route of a system for transferring pressure media in a gaseous and/or liquid state, comprising on both the low-pressure side as well as the high-pressure side, closable connecting pieces or fittings which serve as the connection onto the circulation system of the unit that is to be filled, as well as further connecting means which communicate with the closable connecting pieces for the connection of a vacuum pump or of a supply container containing the pressure medium, and by which manometers are in operative connection with the internal-casing conduit section of the connection means.

BACKGROUND OF THE INVENTION

In many technical fields, for example refrigeration engineering, it is necessary to transfer pressure media into containers, the latter having to be previously evacuated. Refrigerators and, in particular, motor car air-conditioning systems for instance, require for the initial starting or after repair of the system a charging of a cooling medium, as a rule in the form of a liquified gas, in the circulation of the apparatus, for which the circulation has first to be evacuated.

In order that such a process may be carried out in small workshops or even on the road, it is necessary for the mechanic concerned to be able to use a control manifold that permits the precise observation of this relatively dangerous transferring process.

Available on the market is a control manifold having a casing divided into a low-pressure side for evacuating the system to be changed, and a high-pressure side for charging the system with gas. The connecting conduit on the low-pressure side (between the shut-off valve of the intake connecting piece and the shut-off valve of the pump connecting piece) as well as the connecting conduit on the high-pressure side (between the shut-off valve of the inlet connecting piece for the pressure media and the shut-off valve of the outlet connecting piece for the pressure media) are in flow connection by way of a common conduit section in the manifold casing, formed in each case by a junction curve for the respective connecting conduit.

In such a construction, a very elongated, projecting manifold casing with only very difficult-to-manufacture flow routes is unavoidable, which, apart from high costs, also creates an unsatisfactory handling. The whole assembly swings easily and the connected hoses can bend.

OBJECT OF THE INVENTION

It is thus a primary object of the present invention to provide an improved control manifold that allows for safe handling and simple manufacture.

SUMMARY OF THE INVENTION

This is achieved according to the invention in that the casing of the manifold is at least approximately hexagonal, a pair of parallel sides forming thereby the upper and lower narrow side of the casing, between which, the internal-casing conduit section of the connection piece for said vacuum pump and the pressure-medium supply container each extend vertically and approximately concentrically; the conduit sections of the intake and the outlet piece each lead into the upper end area of the supply container, the intake and outlet pieces each running parallel and near to the narrow sides joining at said upper narrow side on the casing.

As a result of these steps, it is hence possible to develop the manifold housing both very compact and manageable by constructing the shortest and absolutely straight, easily-manufactured flow routes, which may now all lie on one level and thereby, in addition, allow a very flat manifold casing to be developed. Moreover, the manometers may project radially upward and are therefore easily readable. On the other hand, all the connecting pieces project more or less downward and thus allow a bend-free connection of flexible hoses.

Accordingly, the arrangement is advantageously in such a manner that a manometer is disposed in each case on the upper narrow side and the narrow sides of the casing joining thereon; and the connecting pieces or fittings project from the narrow sides lying opposite said narrow sides.

In order to be able to follow the process of flow exactly, it is of advantage that the internal-casing conduit section of the connecting piece is partially in visual range of a sight glass.

Furthermore, an advantageous embodiment results thereby in that the connecting piece of the low-pressure side and the high pressure side is common to both; the internal-casing conduit section thereof being, if necessary, alternately in flow connection with the conduit section of the low-pressure side, and of the conduit section of the high-pressure side.

An embodiment of the present invention will now be more particularly described by way of example and with reference to the accompanying drawings, in which:

DESCRIPTION

Figure 1:
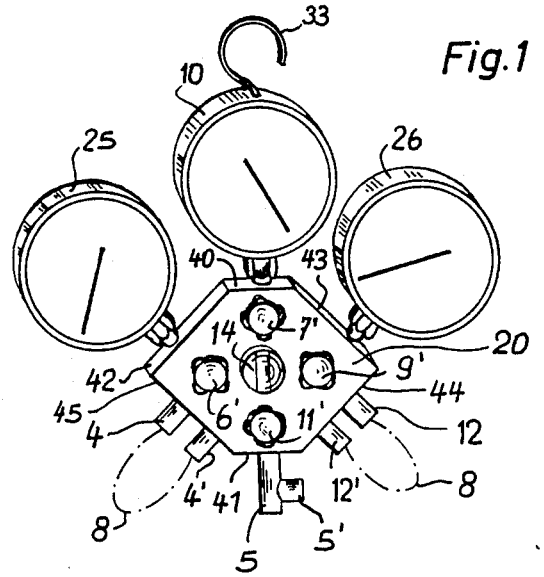
FIG. 1 is a diagrammatic representation of a control manifold, insertable in the flow route of an apparatus, for transferring pressure media in a gaseous and/or liquified gas state.

The control manifold illustrated comprises a manifold casing 20 with a low-pressure side 1 and a high-pressure side 2. The control manifold serves here the purpose of controlling the process of transferring a refrigeration medium in the form of a liquid gas from a charging cylinder aggregate 32 into the circulation of an air-conditioning installation or a refrigerator 31, as well as the control of the evacuation of this circulation 31 by means of a vacuum pump 30 in the manner described below. It is to be said at this point, however, that the control manifold according to the invention may also be used for the control of other flow processes.

The control manifold according to the invention comprises on the low-pressure side 1 an intake connection piece 4 suitable for connection to the circulation 31 by means of a supply line 34, said intake connection piece passes by way of a shut-off valve 6 and is in flow connection with a low-pressure manometer 25 by way of a connecting piece 25'. In a similar manner, the high-pressure side 2 comprises a pressure-outlet connecting piece 12 connected to the circulation 31 by way of a supply line 35; the pressure-outlet connecting piece 12 passes by way of a shut-off valve 9 and is in the flow connection with a charging-pressure manometer 26 by way of a connecting piece 26'.

A connecting piece with a shut-off valve 11 for the alternate or also reversible connecting (not shown) of a vacuum pump 30 by way of a supply line 36 or with the charging cylinder aggregate 32 by way of a supply line 37 is common to both pressure sides and is in flow connection with the aforementioned connecting pieces 4 and 12 by way of a reversing valve 7. The vacuum may be read on a manometer 10 connected to said connecting piece 5.

As shown in particular in FIG. 1, the regulating knobs 6',7',9' and 11' of the respective shut-off valves 6,7,9 and 11 are all arranged on the face of the manifold casing 20, being consequently easily accessible. On the other hand, said connecting pieces 4,5 and 12 project downward from said narrow sides of said casing 20, and said manometers 10,25 and 26 project upward from said narrow sides of said manifold casing 20. A hook 33 projects upward and extends from said middle manometer, allowing the control manifold to be suspended from any place as may be desired.

Figure 2:
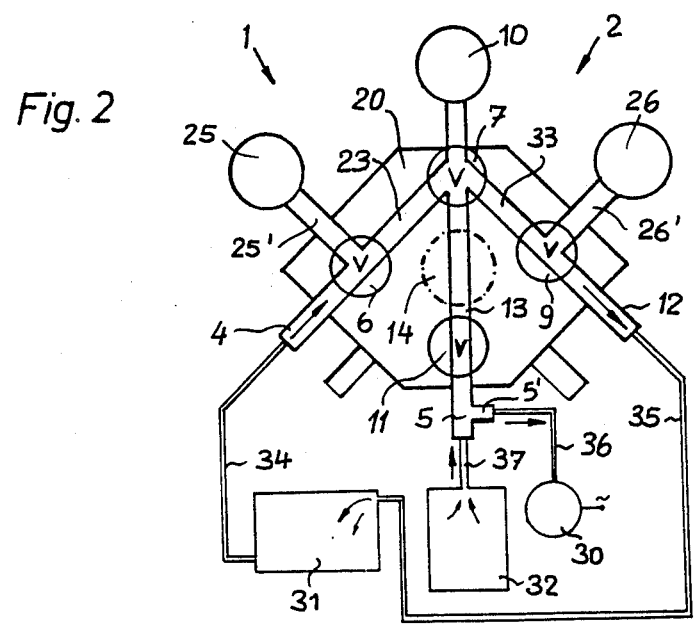
FIG. 2 is a flow diagram showing principles and functions of the control manifold according to FIG. 1.

Further, FIG. 2 shows that said connecting piece 5 with the conduit section 13 thereof is partially in visual range of a sight glass 14.

Moreover, blind fittings 4' and 12' are provided on said casing 20 and which serve the hygroscopic-tight seal of said intake piece 4 and of said outlet piece 12 by means of a connection hose 8 (FIG. 1).

In order, then, to arrive from the usual bar-shaped and hence projecting casing form to a more compact, manageable type of construction with the shortest possible flow routes, the manifold casing is of hexagonal shape. In this connection, a pair of parallel sides forming thereby the upper narrow side 40, and the lower narrow side 41 of said casing, between which, said internal-casing conduit section 13 of said connecting piece 5 for said vacuum pump 30 and for said pressure-media supply container 32 extend vertically and preferably concentrically. The conduit sections 23 and 33 of the intake piece 4, respectively the outlet piece 12 run parallel and near to said narrow sides 42 and 43 joining onto said upper narrow side 40 of said casing 20. All the connecting pieces and all the conduit sections run thereby on one level. This type of construction allows thereby a radial, upward-projecting and thus easily-readable allocation of the manometers, as well as a more or less downward projection of all the connecting pieces, which allows a better bend-free connection of connecting hoses in contrast to that attained with horizontally-projecting connecting pieces.

Accordingly, the development of the manifold is such that a manometer 10 or 25 or 26 is disposed in each case on the upper narrow side 40 and the narrow sides 42,43 of the casing joining thereon and, whereby, the connecting piece 5, the outlet piece 12, and the intake piece 4 project from the narrow sides 41,44,45 lying opposite said narrow sides 40,42,43.

As the illustration clearly shows, due to the choice of the different angle in a segment on the hexagonal manifold casing 20, the obliquity of the connection planes both sides of the upper and the lower narrow sides vary and advantageously the latter are constructed shorter than the connecting planes.

From the foregoing, there results a control manifold of an extremely compact and very flat type of construction which permits optimum handling. In this connection, the control manifold is in a position, despite the short, direct direction of the connection pieces, to fulfill every feasible function. In particular, it is now possible to observe the evacuation process as well as the charging or filling process of the medium from the supply container 32 into the circulation system 31 not only by means of the pressure readings of the manometers, but also in the slight glass 14.

In this connection, various modifications within the bounds of the basic idea of the present invention are absolutely possible. In particular, the reversing valve 7 at the intersection place of the internal-casing conduit section 13,23 and 33 as well as the vacuum manometer 10 can be disposed of, the functions thereof being taken over by the low-pressure manometer 25.

However, precisely this is also an advantage of the hexagonal manifold casing according to the invention: that henceforth an additional manometer solely for the vacuum may be provided in a restricted space, whereas hitherto only one manometer could be disposed on each low-pressure side and high-pressure side.

While there are shown and described present preferred embodiments of the invention, it is to be distinctly understood that the invention is not limited thereto, but may be otherwise variously embodied and practiced within the scope of the following claims.

What I claim is:

1. A control manifold comprising:
   a casing of at least approximately a hexagonal shape having an upper and a lower narrow side parallel to one another, and a pair of sides each adjacent an end of said upper narrow side angled toward one another;
   a closable low-pressure fitting extending into said casing at a low-pressure side thereof and connectable to a circulation system for a pressure medium;
   a closable high-pressure fitting extending into said casing at a high-pressure side thereof and connectable to said circulation system;
   a further closable fitting extending into said casing positioned between said low- and high-pressure fittings connectable to both a vacuum pump and a supply of said pressure medium;
   respective shut-off valves in said casing connected to each of said fittings;
   a further shut-off valve in said casing adjacent said upper narrow side;
   respective conduit sections in said casing communication between said further shut-off valve and each of said shut-off valves connecting said low- and high-pressure fittings, each of said respective conduits running parallel to one of said angled sides of said casing; and
   an approximately centrally positioned conduit section in said casing perpendicular to said upper narrow side communicating between said further shut-off valve and said shut-off valve connecting said further closable fitting.

2. The control manifold as defined in claim 1, wherein said centrally positioned conduit section is at least partially in view from outside said casing through means of a sight glass.

3. The control manifold as defined in claim 1, further comprising a plurality of a manometers each perpendicularly extending from said casing, at least one manometer extending from said upper narrow side and each of said pair of angled sides.

4. The control manifold as defined in claim 1, wherein said closable low- and high-pressure fittings project outward each from a pair of further sides of said casing which are parallel to said pair of angled sides, respectively.

* * * * *